United States Patent [19]

Barthalon

[11] 4,021,151
[45] May 3, 1977

[54] UNITARY RECIPROCATING MOTOR AND COMPRESSOR WITH GAS CUSHIONING

[76] Inventor: Maurice Barthalon, Tournefperre, Allee des Safins, 91370 Verrieres le Buillon, France

[22] Filed: June 10, 1975

[21] Appl. No.: 585,701

Related U.S. Application Data

[63] Continuation-in-part of Ser. No. 480,037, June 17, 1974, abandoned, which is a continuation-in-part of Ser. No. 284,748, Aug. 30, 1972, abandoned.

[30] Foreign Application Priority Data

Aug. 31, 1971  France ............................. 71.31512

[52] U.S. Cl. .............................. 417/417; 417/415; 92/85 B
[51] Int. Cl.² .................. F04B 17/04; F04B 35/04; F01B 11/02
[58] Field of Search ...................... 92/85, 143, 60.5; 417/490, 498, 274, 416, 417, 415

[56] References Cited

UNITED STATES PATENTS

| | | | |
|---|---|---|---|
| 1,345,902 | 7/1970 | Vincent | 417/498 X |
| 1,471,820 | 10/1923 | Beam | 92/85 X |
| 3,159,330 | 12/1964 | Boldt | 92/60.5 X |
| 3,461,806 | 8/1969 | Barthalon | 417/418 |
| 3,542,495 | 11/1970 | Barthalon | 416/418 |

FOREIGN PATENTS OR APPLICATIONS 466,254  6/1950  Canada .............................. 417/490

Primary Examiner—Carlton R. Croyle
Assistant Examiner—Thomas I. Ross
Attorney, Agent, or Firm—Brumbaugh, Graves, Donohue & Raymond

[57] ABSTRACT

An electric motor driven compressor includes a reciprocating free-stroke armature driving a compressor piston in a cylinder. A cylinder head closes the cylinder to form a compression chamber into which opens an intake passage and an output passage selectively closed by valves. The output passage provides an opening into the compression chamber through the cylinder wall at a selected distance from the cylinder head to provide an energy absorbing chamber filled with gas when the piston closes the opening of the output passage during its compression stroke. The energy absorbing gas cushion in the chamber prevents impacts between the piston and cylinder head under varying operating conditions.

18 Claims, 3 Drawing Figures

UNITARY RECIPROCATING MOTOR AND COMPRESSOR WITH GAS CUSHIONING

BACKGROUND OF THE INVENTION

This is a continuation-in-part application of copending application Ser. No. 480,037 filed June 17, 1974, now abandoned, which was a continuation-in-part application of application Ser. No. 284,748 filed Aug. 30, 1972, now abandoned.

This invention relates to reciprocating compressors and, more particularly, to reciprocating compressors driven by reciprocating electric motors.

My U.S. Pat. Nos. 3,461,806 and 3,542,495 disclose reciprocating electric motors driving, inter alia, compressors and pumps. The inventive compressors, and the compressors of those patents, can be used as refrigeration compressors and heat pumps, air and gas compressors of medium and high pressure, and medium and high pressure pumps. While the term compressor is used generally herein, it will be undersood that the term encompasses pumps.

In my aforementioned patents, each of the electric motors includes structure that provides a magnetic field across an air gap defined by a pair of poles, the magnetic lines of force being directed transversely with respect to the axis of movement of the driving armature. The electrical windings generating the magnetic field are connected to a source of electric supply delivering a succession of unidirectional impulses, and the supply circuit includes a device such as a rectifier to prevent reversal of the direction of the electric current in the windings. In each of those motors, magnetic driving free-stroke armatures moving in and out of the motor's air gap are subjected to the action of a return means independent of the magnetic circuit, such that the magnetic circuit ensures the movement of the armature during the power stroke while its movement during the other stroke is provided by the independent return means.

In machines in which the magnetic armature of the motor is coupled to a moving piston of a gas compressor, such as an air compressor, the compressor includes a cylinder carrying a piston. The interior face of a cylinder head forming one end of the cylinder defines with the piston a variable compression chamber. At least one intake passage and one output passage open into the compression space and are arranged to be selectively closed by suitable valves. An elastic return device acts on the piston in a direction urging the magnetic core out of the air gap of the magnetic circuit.

Those compressors which include at least one free-stroke piston are roughly synchronous machines, which means that they operate with a natural (mechanical) frequency in the neighborhood of the frequency of the electric current. When the machine operates at a frequency away from its nominal design point, there exists a phase shift between the reciprocating movement of the moving train and the electric pulses delivered to the magnetic windings. In such compressors, the cycle of the moving train, including the armature and piston, depends upon the operating conditions specifically the gas intake and output pressure. This is particularly evidenced by variations in the phase shift. Under certain conditions, the phase of the moving train is delayed in relation to the phase of the delivery of electric pulses. The variation in mean magnetic resistances following such a phase delay causes an increase in reactive energy stored in the system and, consequently, an increase in the intensity of the current used and consequently in the ohmic losses, and in the coil temperature rise and a decrease in the power factor.

Moreover, if the energy transmitted by the magnetic armature to the piston during the compression cycle exceeds the energy required by the piston to compress the gas, as well as required to depress the elastic return device, injurious impacts between the piston and cylinder head will occur.

To avoid such impacts, there have been proposals to use an elastic return device of greater rigidity so that variations in power caused by variations in operation become small in relation to the means elastic energy stored by the elastic return device. Using this remedy, any variations in the stroke of the moving train would be reduced and the probability of impacts between the piston and the head would also be reduced. Nevertheless, the possibility of impacts would continue in the event that operating conditions approached limit values. In these circumstances, the piston and head would have to be designed to resist such impacts, for example, by employing a neoprene head. Moreover, to ensure proper frequency operation of the movable train, the mass of the train would have to be increased. This would, in turn, result in an increase in weight and expense of the motor-compressor, as well as in the inertia of the moving train with all the disadvantages resulting therefrom, such as slow starting, excessive current on starting, stopping inertia, etc. Furthermore, phase delay would exist as the intensity of the current used under certain operating conditions increased considerably. The magnetic windings and a cooling system would then have to be designed to accommodate heating caused by the increased current intensity, which would further increase the weight and expense of building the motor driven compressor.

SUMMARY OF THE INVENTION

The present invention provides a compressor remedying the above discussed disadvantages. More particularly, the inventive compressor is formed with an output passage opening into a cylinder wall at a distance from the cylinder head sufficient to form with the piston an energy absorbing chamber when the piston closes the output passage opening during its compression stroke. Thus, toward the end of the compression stroke of the piston, an energy absorbing gas cushion is formed in the chamber to absorb the residual potential and kinetic energy of the moving train and prevent impacts between the piston and the head. The energy in the gas cushion is then released to the piston on its return stroke.

BRIEF DESCRIPTION OF THE DRAWINGS

Other features and advantages of the present invention will be understood when the following description of exemplary embodiments is read in conjunction with the accompanying drawings, in which.

DESCRIPTION OF EXEMPLARY EMBODIMENTS

Figure 1:
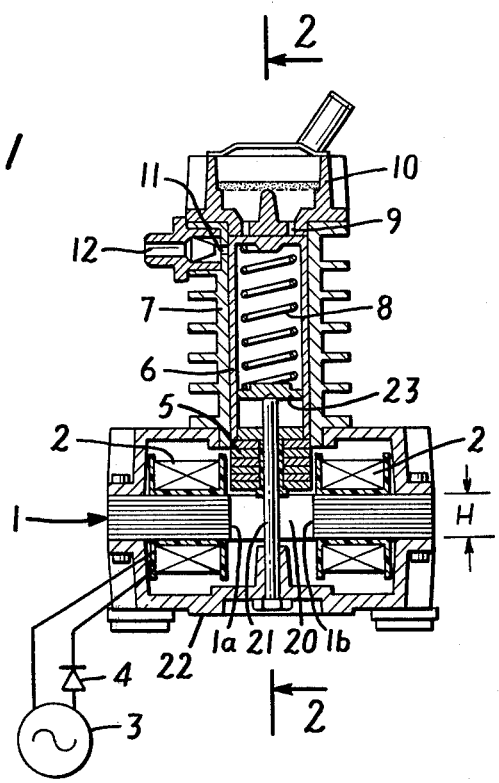
FIG. 1 is an axial cross section of an electric motor driven compressor embodying the present invention.
Figure 2:
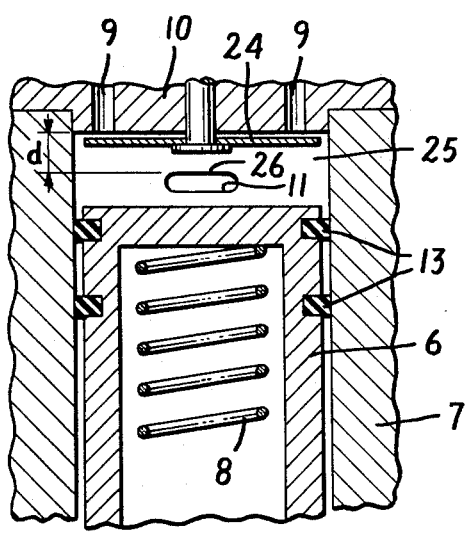
FIG. 2 is a partial cross section through line II—II of FIG. 1, looking in the direction of the arrows, showing an output passage and an energy absorbing chamber in the inventive compressor.

The electric motor driven compressor shown in FIGS. 1 and 2 includes a fixed magnetic circuit 1. Poles 1a and 1b in the magnetic circuit define an air gap 20 across which magnetic flux is provided by electrical windings or coils 2. The windings 2 are supplied by an alternating current source 3 through a rectifier such as a diode 4.

A laminated magnetic armature 5 is guided by a rod 21 fixed to a housing 22 of the motor in such a manner that the armature 5 can carry out a rectilinear reciprocating motion substantially perpendicular to the magnetic flux produced in the gap 20. The armature 5 is coupled to a piston 6 moving in a cylinder 7. The cylinder is closed at one end by a cylinder head 10 formed with passages 9 for air intake, the passages being closable by an annular valve 24.

An output passage 11 for air delivery outside the cylinder provides an opening through the cylinder wall at a distance $d$ from the cylinder head 10. The passage 11 is closable by a typical output valve 12.

The inventor has found that the distance $d$ between the cylinder head 10 and the edge of the output passage 11 which is nearer to the cylinder head 10 should be determined according to the formula:

$$d = H \left[ \left( \frac{1-e}{R^{1/k} - 1} - .08 \right) \right]$$

wherein:
$H$ is the height of the magnetic circuit 1 along the axis of the piston 6;
$e$ is the volumetric efficiency, defined as the ratio of gas volume passing through the output passage to the gas volume swept by the piston at each stroke, with the volumes being measured under the same conditions of pressure and temperature;
$R$ is the ratio of compression;
$k$ is the coefficient of polytropic compression; and
$H$ and $d$ are expressed by the same units of measurement.

In a free-stroke synchronous machine, the height, $H$, of the magnetic circuit determines the length of the stroke. The desired flow and frequency determine the area of the piston. The ratio of compression, $R$, together with $H$ determines the power required, and the frequency condition determines the mass of the moving train and the spring characteristics.

The final factor which determines the distnce $d$ is the volumeric efficiency $e$. In conventional compressors, $e$ generally has a value of about 0.8, but in a free-stroke compressor having an air cushion, $e$ can be significantly smaller.

The inventor has found that the above formula provides a structure for a compressor which is much more efficient in operation, due to the combined phase-turning and air cushion and the energy storage provided by the placement of the output passage 11.

Unless the output passage 11 is located substantially in accordance with the above formula, the advantages obtained by the inventor relating to reduced input power reduced intensity of current and improved power factor required for operation of the compressor are not obtainable.

In experiments conducted by the inventor, it has been found that the compressor with the output passage 11 located in accordance with the above formula has substantially reduced ohmic losses and reduced power input and slightly improved flow characteristics when compared with a similar compressor which does not have such an energy absorbing chamber.

Experiments have shown that the best results are usually obtained when the value of $d$ is substantially equal to the value given by the above formula. However, if $d$ is within a range of $\pm 30\%$ of the optimal value calculated in accordance with the above formula, useful benefits of the energy absorbing chamber are noticeable.

For example, the inventor has manufactured a compressor in which the height $H$ equals 22 mm, the ratio, $R$, equals 3.5, the coefficient of polytropic compression $k$ equals 1.4, and $e$ equals 0.69.

Using the aforementioned formula, one can find:

$$d = 3 \text{ mm}.$$

Hence, the distance $d$ must be between $3 - 0.9$ mm and $3 + 0.9$ mm, with 3 mm being the most suitable value.

Inside the piston 6 is a return device such as a spring 8 which exerts a force between the interior surface of the piston 6 and a small plate 23 carried by the rod 21. Consequently, the spring tends to push the piston towards the head 10 and to cause the magnetic core 5 to leave the air gap 20.

The detailed operation of the electric motor and compressor have been described in my U.S. Pat. Nos. 3,461,806 and 3,542,495 and need not be repeated herein.

In the operation of the compressor, when an electric pulse is applied to the windings 2 through the diode 4, the magnetic armature 5 is attracted by an electromagnetic force into the air gap 20. The piston 6 compresses the spring 8 while moving away from the head 10. The pressure in a compression chamber 25 defined by the head 10 and the piston 6 is reduced and the intake valve 24 opens so as to admit air into the chamber.

As the current in the windings 2 is reduced to zero, and tends to change its polarity, the diode 4 interrupts the current and the potential energy stored in the spring 8 returns the moving train, constituted by the piston 6 and the magnetic armature 5, towards the head 10. The air contained in the compression chamber 25 is compressed and then delivered through the output passage 11 and valve 12.

In accordance with the present invention, the delivery passage 11 has its edge 26 closest to the head 10 placed at selected distance $d$ from the head, as shown in FIG. 2. The passage 11 in the embodiment shown is of oblong shape whereby its dimension in a direction parallel to the axis of the cylinder 7 is smaller than its dimension in a direction perpendicular to such axis.

The piston 6 preferably includes sealing piston rings 13, exaggerated in diameter for clarity. In practice, the clearance between the piston 6 and the cylinder 7 is preferably in the range of from 0.01 to 0.1 millimeters. The edge 26 of the delivery opening 11 and the leading sealing edge of the piston 6 are well defined, meaning that the radius of curvature of each edge approaches zero, to afford a rapid sealing action and efficient seal. Moreover, the piston 6 has a substantially constant diameter over its entire length measured parallel to the axis of the cylinder.

It is evident that during the delivery stroke of the piston 6, when the leading sealing edge of the piston 6 (the first piston ring 13 or the front face of the piston) reaches the edge 26 of the delivery opening, the piston 6 and the head 10 define an energy absorbing chamber 25 filled with part of the compressed air which at that time is under output or delivery pressure. The piston 6 continues its stroke towards the head 10, compressing the air in the chamber 25 to a pressure higher than the output pressure. Such compression absorbs the residual kinetic energy of the piston and also the potential energy which is still stored in the spring 8. The energy absorbing air cushion thus formed in the chamber 25 eliminates impacts between the piston 6 and the head 10.

The energy absorbed by the compression of air forming the energy absorbing cushion is recovered at the start of the following intake stroke of the piston 6. The piston is urged away from the head 10 by the pressure in the chamber 25. The presence of the piston rings 13 as well as the close clearance between the piston and the cylinder ensure excellent sealing of the absorption chamber so that there is efficient recovery of the potential energy stored in the air cushion.

Figure 3:
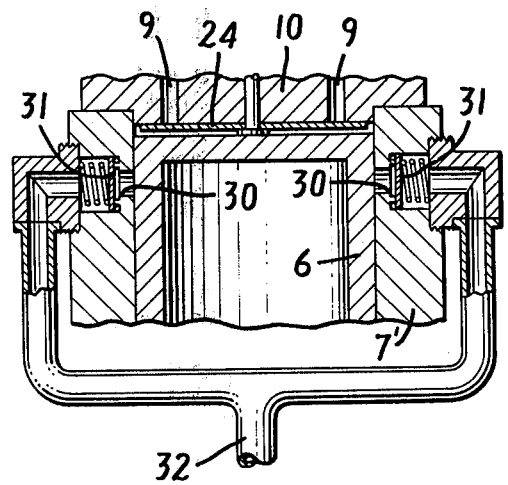
FIG. 3 shows a partial view in cross section of a second embodiment of a compressor in accordance with the present invention.

In the embodiment of the invention shown in FIG. 3, a cylinder 7' is provided with two delivery or output passages 30 carrying delivery valves 31 placed symmetrically with respect to the axis of the cylinder. In this embodiment, the counter pressures on the piston 6 are balanced. The two output passages 30 are connected to a common conduit 32.

The energy absorbing gas cushion provided in accordance with the invention makes it possible to avoid impacts between the piston and the head. Moreover, compression of the cushion varies gradually as the conditions of operation vary which is equivalent to a gradual modification of the effective rigidity of the elastic return device. Experience has shown that under these conditions, the movement of the moving train is consistently advanced in phase relative to the voltage applied to the magnetic windings which eliminates excessive current flow and improves the power factor of the electric motor. By suitable selection of the distance $d$, operating conditions can be provided with decreased current flow and an adequate air cushion without the danger of impact between the piston and the head.

The absorption cushion does not in any manner modify the functioning of the motor when there is no danger of impact. Moreover, even if such impact should occur, the energy absorbed in the cushion is returned to the moving train at the start of the following cycle.

I claim:
1. A synchroneous electric motor driven compressor comprising:
   a. a reciprocating electric motor including a magnetic armature, a magnetic circuit including an air gap, and means guiding the armature for reciprocating movement in and out of the air gap; and
   b. a driven portion comprising a compressor piston coupled to the armature, a cylinder defined by a cylinder wall in which the piston reciprocates, an elastic return device acting on the piston to urge the magnetic armature out of the air gap of the magnetic circuit, a cylinder head at one end of the cylinder to define a compression chamber in the cylinder between the piston and the head, at least one intake passage communicating with the compression chamber, an intake valve to selectively close the intake passage, and an output passage providing an opening into the compression chamber through the cylinder wall, the periphery of said output passage opening nearest the head being at approximaely a disance $d$ from the cylinder head, where $d$ is within 30% of the value given by the formula:

$$d = H\left[\left(\frac{1-e}{R^{1/k}-1} - .08\right)\right]$$

wherein:
$H$ is the height of the magnetic circuit along the axis of the piston;
$e$ is the volumetric efficiency, defined as the ratio of gas volume passing through the output passage to the gas volume swept by the piston at each stroke, with the volumes being measured under the same conditions of pressure and temperature;
$R$ is the ratio of compression;
$k$ is the coefficient of polytropic compression; and
$H$ and $d$ are expressed by the same units of measurement.

2. The compressor defined by claim 1, in which the piston has a sealing relation to the cylinder wall to ensure sealing of the compression chamber when the output passage opening is closed by the piston.

3. The compressor defined by claim 2, in which the clearance between the piston and the cylinder wall ranges from 0.01 to 0.1 millimeters.

4. The compressor defined by claim 1, in which the dimension of the output passage opening measured perpendicularly to the axis of the cylinder exceeds the dimension of the opening measured parallel to the axis of cylinder travel.

5. The compressor defined by claim 1, in which the piston has an essentially constant diameter.

6. The compressor defined by claim 1, wherein two output passages open into the compression chamber and are arranged symmetrically with respect to the longitudinal axis of the cylinder.

7. The compressor defined by claim 1, in which the intake passage opens into the compression chamber through the cylinder head.

8. The compressor defined by claim 1 in which the piston has an edge with a small radius of curvature.

9. The compressor defined by claim 1 in which the output passage opening has an edge with a small radius of curvature.

10. In a synchroneous electric motor driven compressor, a compressor piston coupled to a free-stroke armature of a reciprocating motor, a cylinder defined by a cylinder wall in which the piston reciprocates, a cylinder head at one end of the cylinder to define a compression chamber in the cylinder between the piston and the head, an elastic return device acting on the piston to urge it toward the cylinder head, at least one intake passage communicating with the compression chamber, an intake valve to selectively close the intake passage, and an output passage providing an opening into the compression chamber through the cylinder wall, the periphery of said output passage opening nearest the head being at approximately a distance $d$ from the cylinder head, where $d$ is within 30% of the value given by the formula:

$$d = H\left[\left(\frac{1-e}{R^{1/k}-1} - .08\right)\right]$$

wherein:
$H$ is the height of the magnetic circuit along the axis of the piston;
$e$ is the volumetric efficiency, defined as the ratio of gas volume passing through the output passage to the gas volume swept by the piston at each stroke, with the volumes being measured under the same conditions of pressure and temperature;
$R$ is the ratio of compression;
$k$ is the coefficient of polytropic compression; and
$H$ and $d$ are expressed by the same units of measurement.

11. The compressor defined by claim 10, in which the piston has a sealing relation to the cylinder wall to ensure sealing of the compression chamber when the output passage is closed by the piston.

12. The compressor defined by claim 11, in which the clearance between the piston and the cylinder wall ranges from 0.01 to 0.1 millimeters.

13. The compressor defined by claim 10, in which the dimension of the output passage opening measured perpendicularly to the axis of the cylinder exceeds the dimension of the opening measured parallel to the axis of cylinder travel.

14. The compressor defined by claim 10, in which the piston has an essentially constant diameter.

15. The compressor defined by claim 10, wherein two output passages open into the compression chamber and are arranged symmetrically with respect to the longitudinal axis of the cylinder.

16. The compressor defined by claim 10, in which the intake passage opens into the compression chamber through the cylinder head.

17. The compressor defined by claim 10 in which the piston has an edge with a small radius of curvature.

18. The compressor defined by claim 10 in which the output passage opening has an edge with a small radius of curvature.

* * * * *

UNITED STATES PATENT OFFICE
CERTIFICATE OF CORRECTION

Patent No. 4,021,151         Dated May 3, 1977

Inventor(s) Maurice Barthalon

It is certified that error appears in the above-identified patent and that said Letters Patent are hereby corrected as shown below:

On the cover page of the patent, the inventor's address which reads "Tournefperre, Allee des Safins, 91370 Verrieres le Buillon, France" should read --Tournepierre, Allee des Sapins, 91370 Verrieres Le Buisson, France--.

Signed and Sealed this

Twenty-first Day of March 1978

[SEAL]

Attest:

RUTH C. MASON        LUTRELLE F. PARKER
Attesting Officer     Acting Commissioner of Patents and Trademarks